US011821744B2

(12) United States Patent
Verma et al.

(10) Patent No.: US 11,821,744 B2
(45) Date of Patent: Nov. 21, 2023

(54) RECOMMENDING AN ALTERNATIVE OFF-ROAD TRACK TO A DRIVER OF A VEHICLE

(71) Applicant: Ford Global Technologies, LLC, Dearborn, MI (US)

(72) Inventors: Himanshu Verma, Farmington Hills, MI (US); Fling Finn Tseng, Ann Arbor, MI (US); Swati Johar Rawat, Mississauga (CA)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/497,244

(22) Filed: Oct. 8, 2021

(65) Prior Publication Data

US 2023/0114283 A1     Apr. 13, 2023

(51) Int. Cl.
*G01C 21/34*     (2006.01)
*B60W 40/076*     (2012.01)
*B60W 40/105*     (2012.01)

(52) U.S. Cl.
CPC ....... *G01C 21/3484* (2013.01); *B60W 40/076* (2013.01); *B60W 40/105* (2013.01);
(Continued)

(58) Field of Classification Search
CPC . G01C 21/34; G01C 21/3484; B60W 40/076; B60W 40/105; B60W 2552/05;
(Continued)

(56) References Cited

U.S. PATENT DOCUMENTS

| 9,024,744 B2 | 5/2015 | Klose et al. |
| 10,415,986 B2 | 9/2019 | Meyer et al. |

(Continued)

FOREIGN PATENT DOCUMENTS

| AU | 2013329774 A1 * | 4/2015 | |
| AU | 2021200755 A1 * | 9/2021 | ............. A01B 76/00 |

(Continued)

OTHER PUBLICATIONS

Emmanouil D. Kostopoulos et al, "Real-World Study for the Optimal Charging of Electric Vehicles", Elsevier Energy Reports, Nov. 2020, nine pages.

(Continued)

*Primary Examiner* — Atul Trivedi
(74) *Attorney, Agent, or Firm* — Joseph Zane; Eversheds Sutherland (US) LLP (57) ABSTRACT

The disclosure generally pertains to recommending an alternative off-road track to a driver of a vehicle. In an example method, a processor receives a sensor signal that is generated in response to an operating condition of the vehicle on an off-road track. The operating condition can include, for example, an angular orientation of a chassis portion of the vehicle with respect to a ground surface (yaw, pitch, roll, etc.), steering characteristics, speed characteristics, and/or braking characteristics. The processor evaluates the sensor signal to identify an attribute of the off-road track, such as, for example, a difficulty factor and/or a challenge level. The processor may assign a track score to the off-road track based on the attribute and may provide to the driver, a recommendation for use of another off-road track based on comparing the first track score to a second track score associated with the other off-road track.

17 Claims, 5 Drawing Sheets

(52) U.S. Cl.
CPC ..... *B60W 2400/00* (2013.01); *B60W 2520/10* (2013.01); *B60W 2552/05* (2020.02); *B60W 2552/15* (2020.02)

(58) Field of Classification Search
CPC ......... B60W 2552/15; B60W 2400/00; B60W 2520/10
USPC ....................................................... 701/533
See application file for complete search history.

(56) References Cited

U.S. PATENT DOCUMENTS

| | | | | |
|---|---|---|---|---|
| 2017/0101103 | A1* | 4/2017 | Foster | A01B 63/11 |
| 2020/0216085 | A1* | 7/2020 | Bobier-Tiu | B60W 40/08 |
| 2020/0286310 | A1* | 9/2020 | Carver | G06Q 40/08 |
| 2021/0260949 | A1* | 8/2021 | Corsico | B60G 11/16 |
| 2021/0402877 | A1* | 12/2021 | Velazquez Alcantar | B60W 30/18181 |
| 2022/0016950 | A1* | 1/2022 | Ericksen | B60G 17/08 |
| 2022/0024485 | A1* | 1/2022 | Theverapperuma | G06N 3/04 |
| 2022/0332159 | A1* | 10/2022 | Corsico | B60G 3/20 |
| 2022/0379679 | A1* | 12/2022 | Eisenmann | B60G 17/0165 |
| 2023/0114283 | A1* | 4/2023 | Verma | G01C 21/3484 701/533 |

FOREIGN PATENT DOCUMENTS

| | | | | |
|---|---|---|---|---|
| AU | 2021200757 A1 | * | 9/2021 | ........... B60W 30/02 |
| AU | 2021201019 A1 | * | 9/2021 | |
| AU | 2021201020 A1 | * | 9/2021 | |
| AU | 2021201021 A1 | * | 9/2021 | ........... B60W 30/143 |
| AU | 2021201022 A1 | * | 9/2021 | ........... B60W 10/04 |
| CA | 3085012 A1 | * | 12/2018 | ........... A01B 79/005 |
| CN | 112389440 A | * | 2/2021 | |
| DE | 102019123923 A1 | * | 3/2020 | ............. B60K 6/36 |
| DE | 102019007237 A1 | * | 8/2020 | |
| DK | 201970135 A1 | * | 8/2020 | |
| EP | 3874929 A1 | * | 9/2021 | ........... B60W 30/02 |
| EP | 3878255 A1 | * | 9/2021 | ........... A01B 69/008 |
| EP | 3878256 A1 | * | 9/2021 | ........... A01B 79/005 |
| EP | 3878257 A1 | * | 9/2021 | ......... B60W 30/143 |
| EP | 3878258 A1 | * | 9/2021 | ........... B60W 10/04 |
| EP | 3939812 A1 | * | 1/2022 | |
| GB | 2492896 A | * | 1/2013 | ........... B60W 10/06 |
| GB | 2502802 A | * | 12/2013 | |
| GB | 2505023 A | * | 2/2014 | .............. B60T 8/175 |
| GB | 2508688 A | * | 6/2014 | ........... B60W 10/06 |
| GB | 2508689 A | * | 6/2014 | |
| GB | 2517011 A | * | 2/2015 | ............. B60K 35/00 |
| GB | 2537884 A | * | 11/2016 | ......... B60W 30/143 |
| GB | 2577485 A | * | 4/2020 | |
| GB | 2603013 A | * | 7/2022 | |
| JP | 2017116466 A | * | 6/2017 | |
| WO | WO-2004039620 A1 | * | 5/2004 | |
| WO | WO-2013124321 A1 | * | 8/2013 | |
| WO | WO-2015087181 A1 | * | 6/2015 | ........... B60N 2/0228 |
| WO | WO-2020207762 A1 | * | 10/2020 | |

OTHER PUBLICATIONS

Bharatiraja Chokkalingam et al., "Real-Time Forecasting of EV Charging Station Scheduling for Smart Energy Systems", MDPI, Mar. 16, 2017, 16 pages.

Sang Chon et al., "Intelligent Battery Management and Charging for Electric Vehicles", Texas Instruments Incorporated, 2017, eight pages.

* cited by examiner

| Off-Road Track | Track Score | Number of Visits |
|---|---|---|
| Track 1 | 9 | 15 |
| Track 2 | 3 | 3 |
| Track 3 | 5 | 1 |
| ... | ... | ... |
| Track "n" | "m" | "p" |

405 — Off-Road Track
410 — Track Score
415 — Number of Visits
400

RECOMMENDING AN ALTERNATIVE OFF-ROAD TRACK TO A DRIVER OF A VEHICLE

BACKGROUND

Off-roading is popular among drivers who desire to get off the beaten path and take on challenges associated with driving over unpaved terrain. Some of these drivers prefer to drive across hitherto totally unexplored areas while some others prefer to drive over unpaved driving paths that may have been formed by repetitive use by other drivers. In some cases, a commercial entity may expressly build a driving course that simulates a natural off-road surface having challenging features such as steep slopes and sharp bends. The first few visits to this type of driving course may turn out exhilarating. However, a driver who visits the same driving course (or natural off-road area) again and again may become familiar with the driving challenges associated with the course and may tend to become bored. In some other case, the driver may become complacent and may also be unaware of other courses that offer more challenges or similarities that can prove appealing to the driver. It is therefore desirable to offer a solution that addresses this issue.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for recommending an alternative off-road track to a driver of a vehicle. In an example method, a processor receives a sensor signal that is generated in response to an operating condition of the vehicle on an off-road track. The operating condition can include, for example, an angular orientation of a chassis portion of the vehicle with respect to a ground surface (yaw, pitch, roll, etc.), steering characteristics, speed characteristics, and/or braking characteristics. The processor evaluates the sensor signal to identify an attribute of the off-road track, such as, for example, a difficulty factor and/or a challenge level. The processor may assign a track score to the off-road track based on the attribute and may store the track score in a database of a classification system for off-road tracks. In an example implementation, the database may be provided in a server computer. The processor may also provide to the driver of the vehicle, a recommendation for use of another off-road track based on comparing the first track score to a second track score associated with the other off-road track. The second track score may also be stored in the database of the server computer.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the described example embodiments but should be defined only in accordance with the claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. More particularly, it must be understood that the description with respect to battery charging stations in a battery charging lot does not in any way preclude implementation of the disclosure upon battery charging stations that are located elsewhere, such as, for example, in a parking space of a private or a public entity.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure encompasses various types of vehicles such as, for example, a sedan, a sports utility vehicle, a truck, a van, a bus, a driver-operated vehicle, a semi-autonomous vehicle, or an autonomous vehicle. The word "off-road" as used herein refers to any type of track, path, or ground that is unpaved and has a driving surface containing natural materials such as mud, clay, sand, gravel, snow, ice, and/or rocks. Some of these off-road tracks may be natural, while some others may be man-made for specific purposes such as racing, amusement, driver training, and driving challenges. Various off-track road tracks may present various levels of driving difficulty, such as for example, a first type of off-road track that caters to leisurely or weekend drivers driving unmodified vehicles and a second type of off-road track having terrain (hills, slopes, bends, etc.) that can prove challenging to professional drivers driving customized vehicles (specialty tires, high chassis, heavy-duty shock absorbers, high intensity lamps, etc.). The word "image" as used herein can be a standalone digital image or an image that is a part of a video clip or video stream. Words such as "detector" and "*sensor" may be used interchangeably and must be understood in the context in which used. Words such as "information" and "data" may be used interchangeably and must be understood in the context in which used. It must be understood that words such as "implementation," "scenario," "case," "application," "procedure," and "situation" that are used herein are shortened versions of phrases that include either of the following suffixes: "in accordance with the disclosure," or "in accordance with an embodiment of the disclosure." It should also be understood that the word "example" as used herein is intended to be non-exclusionary and non-limiting in nature.

Figure 1:
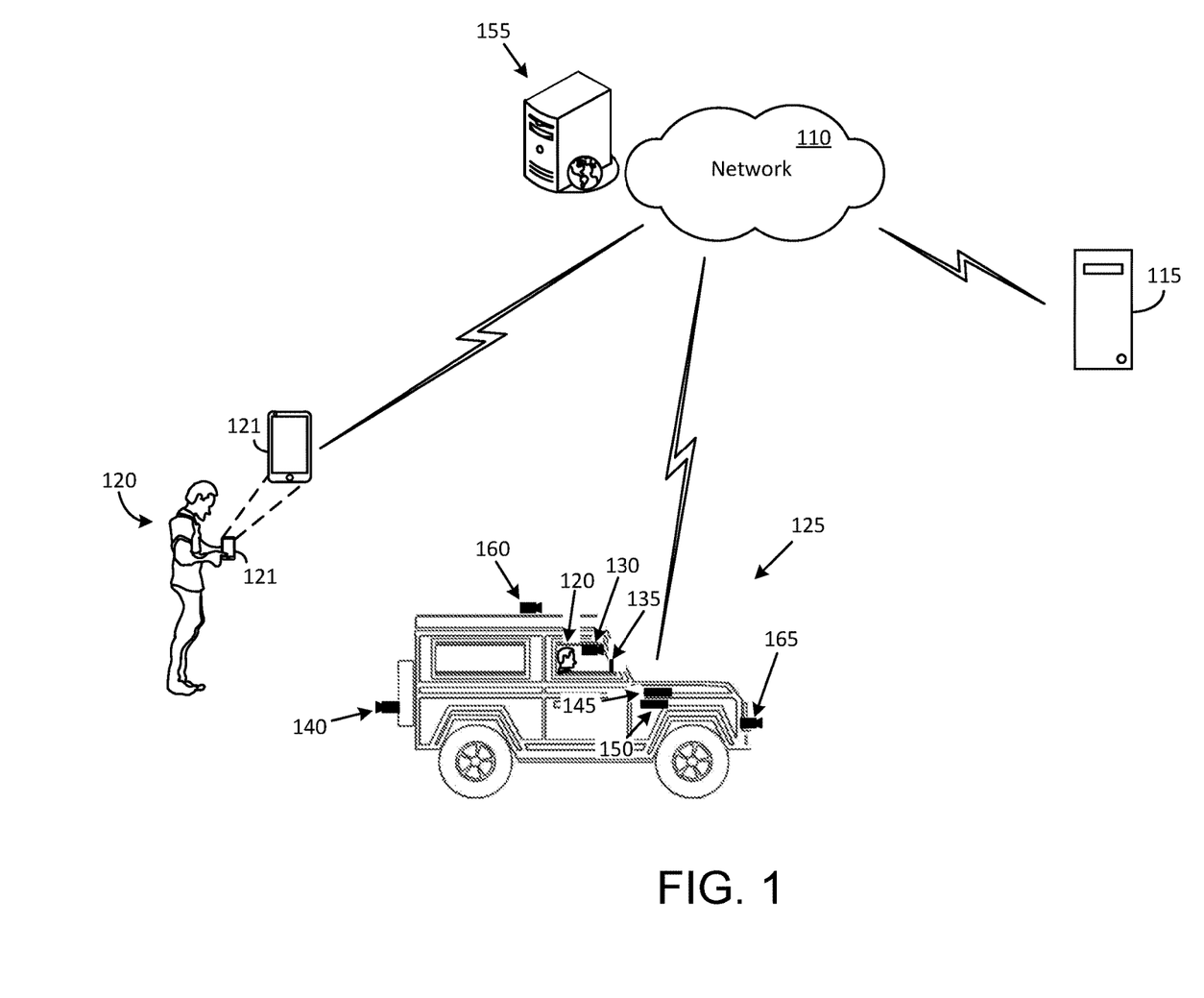
FIG. 1 illustrates an example vehicle that includes an off-road evaluation system in accordance with an embodiment of the disclosure.

FIG. 1 illustrates an example vehicle 125 that includes an off-road evaluation system 150 configured to communicate with various devices in accordance with an embodiment of the disclosure. In an example embodiment, the off-road evaluation system 150 includes a computer that is located in a vehicle 125. In another example embodiment, the off-road evaluation system 150 may be distributed over one or more other computers that cooperate with the computer in the vehicle 125 to execute various operations in accordance with the disclosure. The other computers can include, for example, a server computer 115, a cloud computer 155, and/or a personal communication device 121 of a driver 120 of the vehicle 125.

The vehicle 125 may be any of various types of vehicles such as, for example, a sedan, a sports utility vehicle, a truck, a van, a driver-operated vehicle, a semi-autonomous vehicle, or an autonomous vehicle. In the illustrated example, the vehicle 125 is operated by a driver 120 who likes to drive the vehicle 125 over off-road tracks at various times such as, for example, some weekdays, weekends, or holidays. The vehicle 125 can include components such as, for example, a vehicle computer 145, an infotainment system 135, the off-road evaluation system 150, and various sensors and detection devices.

The vehicle computer 145 may perform various functions such as controlling engine operations (fuel injection, speed control, emissions control, braking, etc.), managing climate controls (air conditioning, heating etc.), activating airbags, issuing warnings (check engine light, bulb failure, low tire pressure, vehicle in blind spot, etc.), and activating various vehicle components such as the horn and lights.

In the illustrated scenario, the off-road evaluation system 150 is configured to execute various operations associated with evaluating and assigning a track score to an off-road track. Track scores of one or more off-road tracks visited by the driver 120 in the vehicle 125 may be stored in a local database that is located in the vehicle 125. In an example implementation, a portion of the off-road evaluation system 150 such as, for example, a version of an off-road track evaluation software and/or a central database, may be provided in the server computer 115 and/or the cloud computer 155. Information stored in the central database can include, for example, track scores assigned to various off-road tracks based on evaluations carried out by various vehicles. The track scores can reflect various attributes of the various tracks such as, for example, a difficulty factor associated with traversing each off-road track. For example, a first off-road track having a track score of 3 (out of 10) may be relatively easier for the driver 120 to traverse in comparison to a second off-road track having a track score of 9 (out of 10). The difficulty factor can depend upon various characteristics of the terrain, such as, for example, coarseness (due to a gravel surface, for example), roughness (due to pebbles, for example), ruggedness (due to rocks and boulders, for example), resistance (due to sand, for example), and/or slickness (due to ice, for example).

The track scores stored in the central database may allow the driver 120, and/or other drivers, to compare various off-road tracks in a standardized format. In an example embodiment, the off-road evaluation system 150 may provide a recommendation to the driver 120, about another off-road track that is either more challenging, less challenging, or substantially similar, to an off-road track that the driver 120 is currently visiting or has been frequenting in the past. The recommendation can be based on the other off-road track having a track score that is either greater than, less than, or substantially similar, to a track score assigned to the off-road track that the driver 120 is currently visiting or has been visiting so far.

The server computer 115 and the cloud computer 155 may be configured to communicate with the off-road evaluation system 150, the vehicle computer 145, and/or the infotainment system 135 via wireless technologies such as, for example, Wi-Fi, Ultra-Wideband (UWB), or cellular communications.

In yet another implementation, a portion of the off-road evaluation system 150 may be provided in the personal communication device 121 of the driver 120, such as, for example, hardware and/or software for displaying a recommendation to use another off-road track. The personal communication device 121 may communicate with the vehicle computer 145 and/or the infotainment system 135 via wireless technologies such as, for example, cellular. Bluetooth®, Ultra-Wideband (UWB), Wi-Fi, or Zigbee®.

The infotainment system 135 can include elements such as, for example, a radio, an MP3 player, a global positioning system (GPS) device, a clock, and a display screen. The infotainment system 135 can further include a graphical user interface (GUI) or a human machine interface (HMI) that is displayed on the display screen. The GUI or HMI accepts input from the driver 120, and/or displays various items pertaining to operations related to off-road tracks. An example item that may be displayed on the display screen of the infotainment system 135 can be a recommendation to another off-road track, a track score of the recommended off-road track, and/or a track score assigned to the off-road track being currently frequented by the driver 120.

The off-road evaluation system 150 may be configured to communicate via a network 110 with various devices such as, for example, the server computer 115 and the cloud computer 155. The network 110 may include any one, or a combination of networks, such as a local area network (LAN), a wide area network (WAN), a telephone network, a cellular network, a cable network, a wireless network, and/or private/public networks such as the Internet. For example, the network 110 may support communication technologies such as Wi-Fi, Wi-Fi direct, Ultra-Wideband (UWB), machine-to-machine communication, and/or man-to-machine communication.

At least one portion of the network 110 includes a wireless communication link (a WiFi link, for example), that allows the off-road evaluation system 150 and/or the infotainment system 135 of the vehicle 125 to communicate with the server computer 115 and/or the cloud computer 155. The network 110 may also support a wireless communication link (a cellular link, for example) that allows the server computer 115 and/or the cloud computer 155 to communicate with the personal communication device 121 carried by the driver 120. The personal communication device 121 can be any of various smart devices such as, for example, a smartphone, a tablet computer, a phablet (phone plus tablet), a wearable computer, or a laptop computer.

The vehicle 125 may include various sensors and detection devices that are communicatively coupled to the off-road evaluation system 150 and/or the vehicle computer 145. A few examples of such sensors and detection devices can include a camera, an accelerometer, a magnetometer, a pressure transducer, a speed sensor, an ultrasonic sensor, a radar sensor, a light detection and ranging (LIDAR) detector, and a global positioning system (GPS) device. Sensors and detectors such as the pressure transducer, the accelerometer, and the magnetometer, the pressure transducer, and the speed sensor, may be configured to generate sensor signals that reflect various operating conditions of the vehicle 125 and can be evaluated by the off-road evaluation system 150 to characterize an off-road track. The various operating conditions of the vehicle 125 can include, for example, an angular orientation of a chassis portion of the vehicle 125 with respect to a ground surface (yaw, pitch, roll, etc.), steering characteristics, speed characteristics, and/or braking characteristics. The angular orientation of the chassis portion of the vehicle 125 with respect to the ground surface can provide information about the steepness of a slope in the off-road track and/or a bend in the contour of the off-road track. The steering characteristics can provide information about the surface of the off-road track (slippery gravel surface, loose sand surface, grippy mud surface, etc.). The speed characteristics and/or the braking characteristics can provide information about the difficulty in driving over the off-road track (nature of the driving surface, negotiating bends, negotiating slopes, negotiating curves, etc.). Various operating conditions of the vehicle 125 may also be obtained from the vehicle computer 145, such as, for example, gear settings, gear shifts, and engine revolutions per minute (rpm).

In the illustrated example, the detection devices include a camera 130, a camera 165, a camera 140, and a camera 160. The camera 130, which can be mounted facing forwards on a rear-view mirror of the vehicle 125 or a dashboard of the vehicle 125, and the camera 165, which can be mounted on a front bumper of the vehicle 125, are arranged to capture images of objects located in front of the vehicle 125 and of the terrain on an off-road track ahead of the vehicle 125. The terrain may, for example, include a ground area ahead, a hill, some bushes, a tree, and other objects that the driver 120 has to watch out for and perform actions such as, for example, engage a lower gear, swerve, or circumnavigate. The camera 140, which can be mounted on a rear bumper of the vehicle 125, is arranged to capture images of objects located behind the vehicle 125 and of the terrain below the vehicle 125. In one implementation, the camera 165 and/or the camera 140 can be arranged to obtain images of the wheels of the vehicle 125 that may be evaluated by off-road evaluation system 150 to identify a nature of the driving surface (gravel, sand, etc.). The camera 160 may be mounted on the roof of the vehicle 125 to capture images of objects located at various locations around the vehicle 125.

In an example implementation, the camera 160 is an imaging system containing multiple cameras arranged to provide a 3600 view all around the vehicle 125 and to convey to the off-road evaluation system 150, captured images of multiple objects all around the vehicle 125 and/or the terrain around the vehicle 125. The camera 130, the camera 165, the camera 140, and/or the camera 160 can be any of various types of cameras, including, for example, a digital camera that captures digital images, a video camera that produces video clips and/or streaming video, and a night-vision camera that captures images and/or video in low light conditions. The images, video, and/or streaming video may be conveyed to the off-road evaluation system 150. The off-road evaluation system 150 may evaluate the images, video, and/or streaming video for various purposes such as, for example, to evaluate the terrain over which the vehicle 125 may be traveling and/or to determine an operating condition of the vehicle 125.

Figure 2:
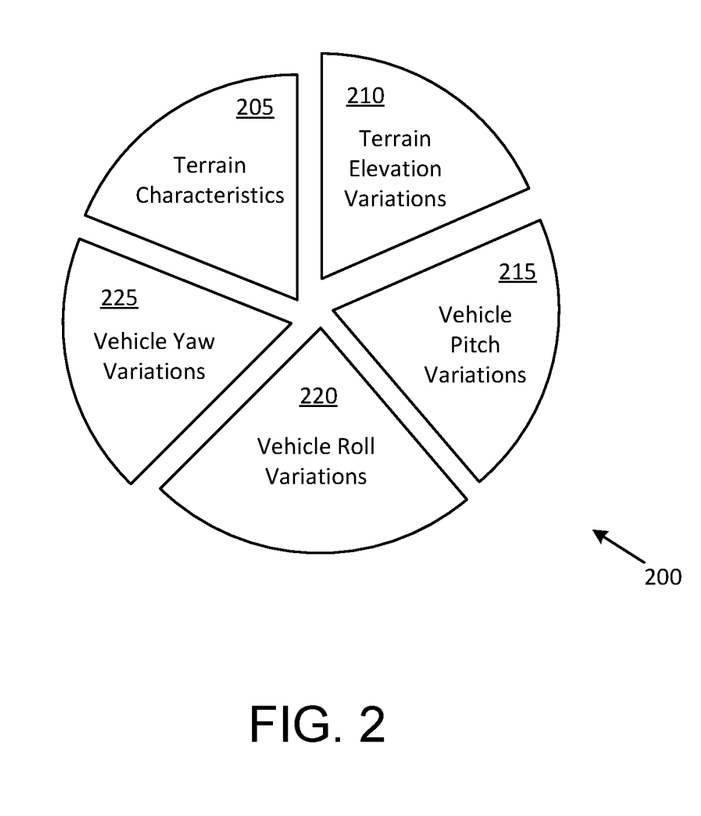
FIG. 2 illustrates some example parameters that may be evaluated by an off-road evaluation system in accordance with an embodiment of the disclosure.

FIG. 2 illustrates some example parameters that may be evaluated by the off-road evaluation system 150 in accordance with an embodiment of the disclosure. The example parameters, which are depicted as segments of a circular representation 200, may be characterized on the basis of various types of sensor signals received from various sensors provided in the vehicle 125. The off-road evaluation system 150 may evaluate some or all of these parameters in order to assign a track score to an off-road track.

Segment 205 pertains to terrain characteristics of an off-road track. The terrain characteristics can include, for example, coarseness (such as due to a gravel surface), roughness (such as due to pebbles), ruggedness (such as due to rocks and boulders), resistance (such as due to sand), and/or slickness (such as due to ice).

Segment 210 pertains to terrain elevation variations such as, for example, a height of a hilly section, a depth of an indentation, and/or a flatness of a section.

Segment 215 pertains to vehicle pitch variations, which pertain to an angle at which the vehicle 125 is tilted with respect to a transverse axis of the vehicle 125. Pitch may be characterized as a condition where a front end of the vehicle 125 is at a higher position than a rear end of the vehicle 125 (or vice-versa) due to a gradient in an off-road track. Pitch information can be provided to the off-road evaluation system 150 in the form of sensor signals from various types of sensors, such as, for example, accelerometers and magnetometers. The off-road evaluation system 150 can evaluate the sensor signals to identify a nature of an off-road track (hilly or substantially flat, for example).

Segment 220 pertains to vehicle roll variations, which pertain to an angle at which the vehicle 125 is tilted with respect to a longitudinal axis of the vehicle 125. Roll may be characterized as a condition where a driver-side of the vehicle 125 is at a higher position than a passenger-side of the vehicle 125 (or vice-versa) due to a gradient in an off-road track. Roll information can be provided to the off-road evaluation system 150 in the form of sensor signals from various types of sensors, such as, for example, accelerometers and magnetometers. The off-road evaluation system 150 can evaluate the sensor signals to identify a nature of an off-road track (hilly or substantially flat, for example).

Segment 225 pertains to vehicle yaw variations, which pertain to an angle at which the vehicle 125 is angled with respect to a vertical axis of the vehicle 125. Yaw may be characterized as a condition where the vehicle 125 is oriented at an angle with respect to a desired heading and a front portion of the vehicle 125 is tilted with reference to a rear portion of the vehicle 125 (or vice-versa). Yaw information can be provided to the off-road evaluation system 150 in the form of sensor signals from various types of sensors, such as, for example, radar sensors and LIDAR. The off-road evaluation system 150 can evaluate the sensor signals to identify a nature of an off-road track (bends and curves, for example).

Figure 3:
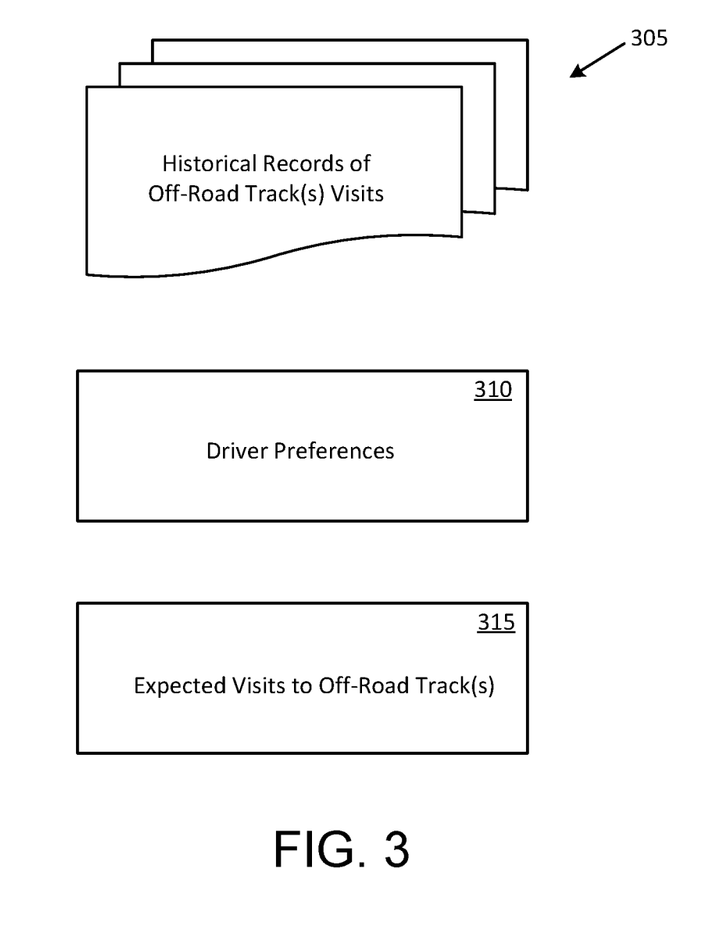
FIG. 3 illustrates some example operations that may be carried out by an off-road evaluation system in accordance with an embodiment of the disclosure.

FIG. 3 illustrates some example operations that may be carried out by the off-road evaluation system 150 in accordance with an embodiment of the disclosure. A first example operation 305 pertains to collecting data regarding visits made by the vehicle 125 to a particular off-road track, and storing the data in a database in the form of historical records. The historical records can provide various types of information to the off-road evaluation system 150, such as, for example, information about the off-road track and information about the driver 120. For example, the driver 120 may visit the particular off-road track on a very regular basis and the nature of the off-road track (challenging, easy, short, long, beginner skill, average skill, expert skill, etc.) can provide to the off-road evaluation system 150 an indication of a personal preference of the driver 120.

A second example operation 310 pertains to determining the personal preference of the driver 120 based, for example, on the historical records referred to above, and/or based on input provided by the driver 120 via the HMI of the infotainment system 135 and/or the personal communication device 121, for example. The personal preference can reflect, for example, a level of risk that the driver 120 is willing to take when driving on an off-road track, a proximity of the off-road track to a residence or a workplace of the driver 120, fees associated with usage of the off-road track (if the off-road track is a commercial property), and time preferences (weekend getaway to an off-road track in a wilderness area, for example).

A third example operation 315 pertains to predicting a future visit to a particular off-road track or to other off-road tracks. In an example implementation, the off-road evaluation system 150 may evaluate the historical records to determine the personal preferences of the driver 120 and provide a recommendation to visit a hitherto unvisited track. The unvisited track may have certain characteristics that appeal to the driver 120.

Figure 4:
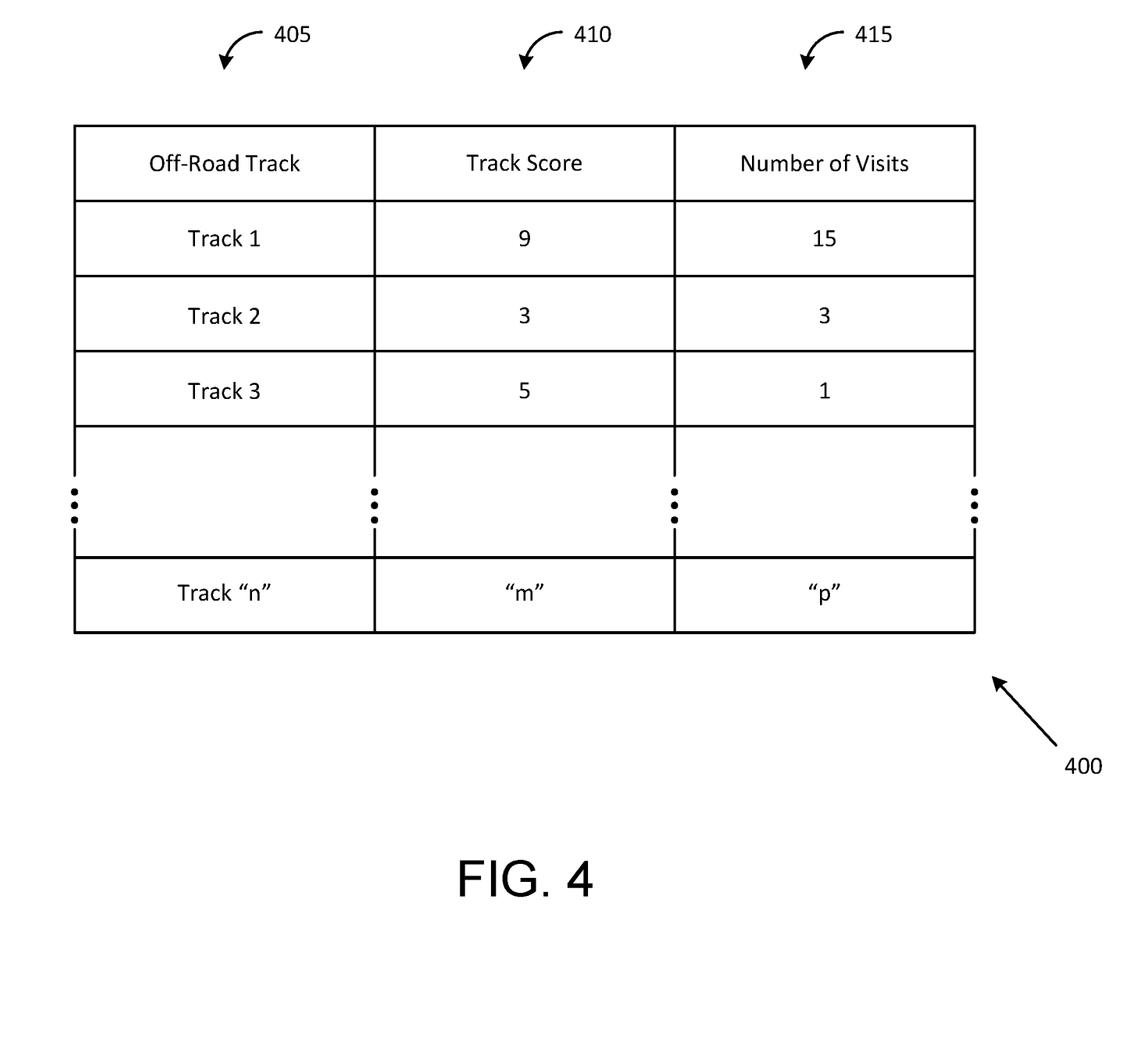
FIG. 4 shows a tabulation of off-road track related information associated with a vehicle in accordance with an embodiment of the disclosure.

FIG. 4 shows a tabulation 400 of off-road track related information associated with the vehicle 125 in accordance with an embodiment of the disclosure. The contents of the tabulation 400 may be stored in a database of the off-road evaluation system 150. The database may be provided in a device mounted on the vehicle 125 or on other devices such as the cloud computer 155 and the server computer 115.

Column 405 shows a listing of "n" off-road tracks (n≥1) that the vehicle 125 has visited. Column 410 shows track scores assigned by the off-road evaluation system 150 to each of the off-road tracks shown in column 405. Each track score is assigned on the basis of one or more attributes of an off-road track. The attributes are identified by evaluating sensor signals produced by sensors in the vehicle 125 when the vehicle 125 is traveling over the off-road track. The sensor signals may be produced in response to various driving characteristics such as, for example, an approach angle of the vehicle 125 when moving on an off-road track, a departure angle of the vehicle 125 when moving on an off-road track, a yaw, roll and/or pitch angle of the vehicle 125 when moving on an off-road track, a ramp-over angle of the vehicle 125 when moving on an off-road track, a steering angle of a steering wheel of the vehicle 125 when the vehicle 125 is moving on an off-road track, a speed of the vehicle 125 when moving on an off-road track, engaging of an accelerator of the vehicle 125 when the vehicle 125 is moving on an off-road track, engaging of a brake of the vehicle 125 when the vehicle 125 is moving on an off-road track, damper displacement of the vehicle 125 when moving on an off-road track, and swerves and/or deviations executed by the vehicle 125 when moving on an off-road track.

Column 415 shows a listing on the number of visits made by the vehicle 125 to each of the "n" off-road tracks. Track 1 having a track score of 9 has been visited 15 times by the vehicle 125. Track 2 having a track score of 3 has been visited 3 times by the vehicle 125. Track 3 having a track score of 5 has been visited once by the vehicle 125. Track "n" having a track score of "m" has been visited "p" times by the vehicle 125.

In one embodiment, the tabulation 400 is limited to a single vehicle, such as, for example, the vehicle 125. In another embodiment, the tabulation 400 may be based on multiple vehicles. Information derived from multiple vehicles can allow the off-road evaluation system 150 to characterize an off-road track based on a larger sampling size that may appeal to various types of drivers having diverse preferences.

In an example implementation, the off-road evaluation system 150 may evaluate the tabulation 400 to determine the personal preferences of the driver 120 and provide a recommendation to either re-visit one of the "n" tracks or visit a hitherto unvisited track. In an example procedure to provide a recommendation, the off-road evaluation system 150 may assign a personal preference score based on calculating a mean value of the sum of track scores weighted by the number of visits to a respective off-road track. The personal preference score may be calculated as follows:

Personal preference score =
$$\sum_{i=1}^{n} \text{sum}\left(\frac{\text{Track Score\_i} * \text{Number of Visits\_i}}{\text{Total of Number of Visits}}\right)$$

When recommending a hitherto unvisited off-road track, the off-road evaluation system 150 may compare a track score assigned to the hitherto unvisited off-road track to the personal preference score of the driver 120. In one case, the off-road evaluation system 150 may recommend the hitherto unvisited off-road track if the track score of the hitherto unvisited off-road track is substantially similar to the personal preference score of the driver 120. Such a recommendation may be based on the off-road evaluation system 150 determining that the driver 120 has a strong preference to a certain type of track (for example, Track 1) and may be interested in trying out a new off-road track that is substantially similar, for reasons such as, for example, experiencing a change of location, a different visit time, accompanying friends, and/or accompanying a family member).

In another case, the off-road evaluation system 150 may recommend the hitherto unvisited off-road track if the track score of the hitherto unvisited off-road track is higher than the personal preference score of the driver 120. Such a recommendation may be based on evaluating the tabulation 400 and/or based on input provided by the driver 120 (via the HMI of the infotainment system 135 and/or via the personal communication device 121).

The recommendation to re-visit one of the "n" tracks or visit a hitherto unvisited track may be provided by the off-road evaluation system 150 at various times. In one scenario, the recommendation may be provided prior to the driver 120 setting out to visit an off-road track. In another scenario, the recommendation may be provided after the off-road evaluation system 150 has accumulated enough information such as, for example, when a number of visits to one or more off-road tracks exceeds a threshold count. In yet another scenario, the recommendation may be provided when the off-road evaluation system 150 evaluates the information in the tabulation 400, for example, and identifies a trend where the driver is visiting "n" off-road tracks (n>1) which may be an indication that the driver 120 is unsatisfied with the nature of each of the visited off-road tracks. In this scenario, the off-road evaluation system 150 may recommend a hitherto unvisited off-road track that has attributes different from those of the off-road tracks already visited by the driver 120. For example, the hitherto unvisited off-road track may include steep slopes and rough terrain that pose a greater challenge to the driver 120 than presented by the off-road tracks already visited by the driver 120.

Figure 5:
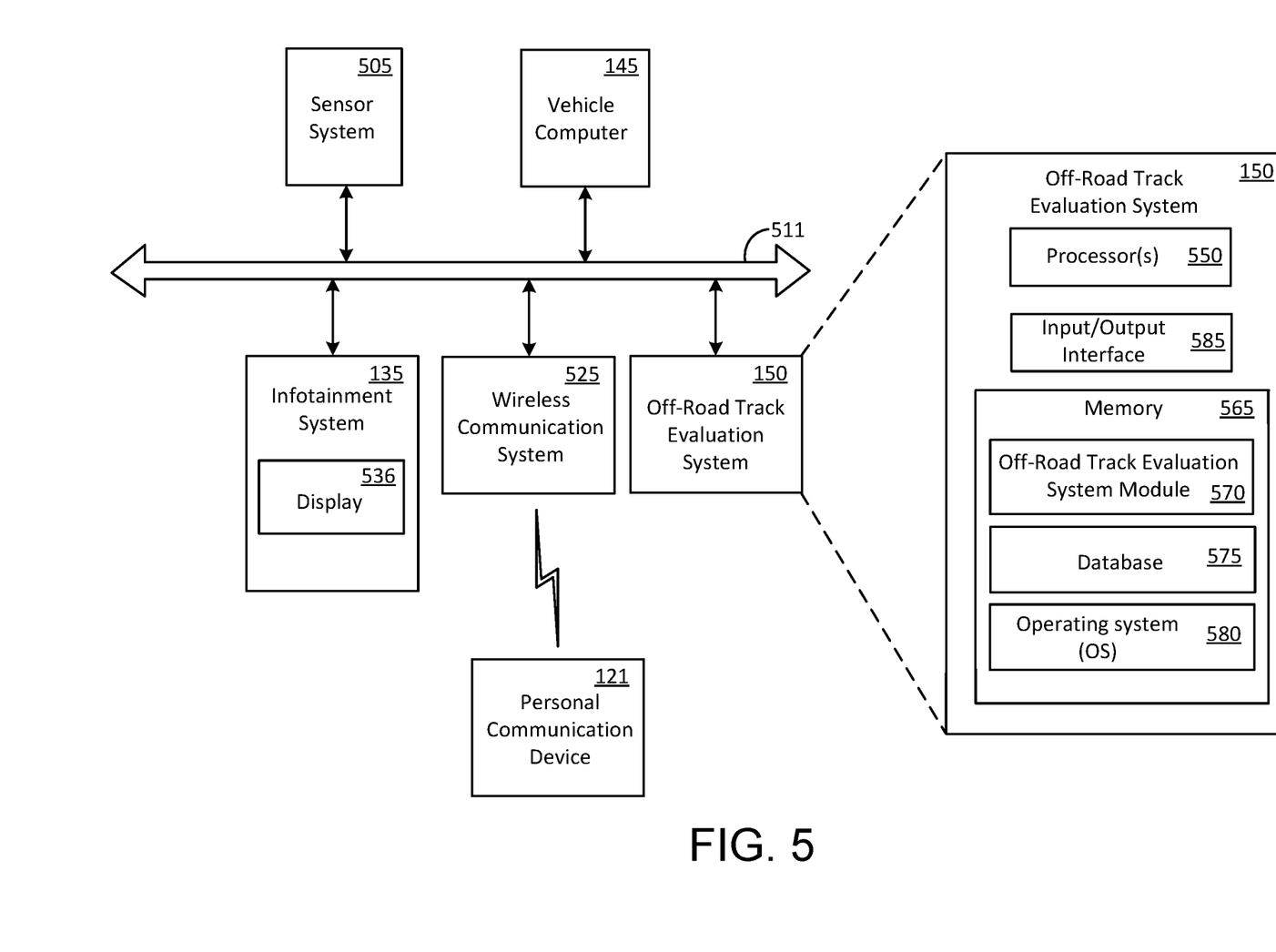
FIG. 5 shows some example components that may be included in an off-road evaluation system in accordance with an embodiment of the disclosure.

FIG. 5 shows some example components that may be provided in the vehicle 125 in accordance with an embodiment of the disclosure. The example components in the vehicle 125 can include the vehicle computer 145, a sensor system 505, the infotainment system 135, a wireless communication system 525, and the off-road evaluation system 150, which are communicatively coupled to each other via a bus 511. The bus 511 can be implemented using one or more of various wired and/or wireless technologies. For example, the bus 511 can be a vehicle bus that uses a controller area network (CAN) bus protocol, a Media Oriented Systems Transport (MOST) bus protocol, and/or a CAN flexible data (CAN-FD) bus protocol. Some or all portions of the bus 511 may also be implemented using wireless technologies such as Bluetooth®, ZigBee®, Ultra-Wideband (UWB), near-field-communications (NFC), cellular, Wi-Fi, Wi-Fi direct, machine-to-machine communication, and/or man-to-machine communication.

The sensor system 505 may include various sensors and detection devices that are communicatively coupled to the off-road evaluation system 150 and/or the vehicle computer 145. A few examples of such sensors and detection devices can include a camera, an accelerometer, a magnetometer, an ultrasonic sensor, a radar detector, a LIDAR detector, a global positioning system (GPS), and a vehicle speed sensor.

The infotainment system 135 can be an integrated unit that includes various components such as, for example, a radio, an MP3 player, and a display 536. The display 536 may include a graphical user interface (GUI) for use by the driver 120 to observe information and/or messages provided by the off-road evaluation system 150. An example item that may be displayed on the display screen of the infotainment system 135 can be a recommendation pertaining to an alternative off-road track.

The wireless communication system 525 may include elements such as, for example, wireless transmitters and receivers that enable communications between the off-road evaluation system 150 and various devices, such as, for example, the personal communication device 121 of the driver 120, the cloud computer 155, and/or the server computer 115.

The off-road evaluation system 150 may include a processor 550, an input/output interface 585, and a memory 565. In some implementations, some or all parts of the off-road evaluation system 150 (such as, for example, the processor 550 and the memory 565) may be incorporated into the vehicle computer 145. The memory 565, which is one example of a non-transitory computer-readable medium, may be used to store an operating system (OS) 580 and various code modules such as, for example, an off-road evaluation system module 570. The code modules are provided in the form of computer-executable instructions that can be executed by the processor 550 for performing various operations in accordance with the disclosure. More particularly, the off-road evaluation system module 570 may be executed by the processor 550 for performing various operations in accordance with the disclosure, including, for example, identifying one or more attributes of an off-road track based on evaluating sensor signals and assigning a track score to an off-road track. The input/output interface 585 may be configured, for example, to receive signals from various sensors of the sensor system 505 and for sending recommendations (generated by the processor 550) to the infotainment system 135 for display on the display 536.

In an example off-road track evaluation procedure, the processor 550 may cooperate with a processor of the vehicle computer 145 to perform various operations such as the example operations described above. The database 575 may be used to store various types of data such as, for example, the tabulation 400 referred to above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 550, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 565, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones. PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    receiving, by a processor, a sensor signal from a sensor in a vehicle that is on a first off-road track, wherein the sensor signal is associated with an operating condition of the vehicle;
    determining, by the processor and based on the operating condition, an attribute of at least one track parameter of the first off-road track, wherein the attribute is a difficulty factor, and wherein the at least one track parameter comprises:
    a terrain characteristic parameter;
    a terrain elevation variation parameter;
    a vehicle pitch variation parameter;
    a vehicle roll variation parameter; and
    a vehicle yaw variation parameter;
    evaluating the difficulty factor of the at least one track parameter to determine a first track score of the first off-road track;
    assigning, by the processor and based on the attribute, the first track score to the first off-road track; and
    storing, by the processor, the first track score in a database of a classification system for off-road tracks.

2. The method of claim 1, wherein the operating condition of the vehicle on the first off-road track comprises an angular orientation of a chassis portion of the vehicle with respect to a ground surface of the first off-road track, a steering angle of a steering wheel of the vehicle, a speed of movement of the vehicle, and/or a braking operation performed upon a brake of the vehicle.

3. The method of claim 1, further comprising:
    providing, by the processor, a recommendation for use of a second off-road track based on comparing the first track score assigned to the first off-road track to a second track score assigned to the second off-road track.

4. The method of claim 1, further comprising:
determining, by the processor, whether the first track score is greater than, less than, or substantially similar to a second track score assigned to a second off-road track;
determining, by the processor, a preference for risk by a driver of the vehicle; and
recommending, by the processor, the second off-road track based on comparing the first track score to the second track score and on the preference for risk by the driver of the vehicle.

5. The method of claim 1, wherein the first track score is attributable to a first level of difficulty associated with the first off-road track, the method further comprising:
determining, by the processor, that a second track score assigned to a second off-road track is greater than the first track score assigned to the first off-road track, the second track score attributable to a second level of difficulty that is greater than the first level of difficulty; and
recommending, by the processor, the second off-road track for traversing by the vehicle, based on determining that the second track score is higher than the first track score.

6. The method of claim 1, further comprising:
identifying, by the processor, a usage statistic of the first off-road track by the vehicle; and
generating, by the processor, a recommendation for use of a second off-road track based on the usage statistic of the first off-road track by the vehicle and further based on comparing the first track score to a second track score assigned to the second off-road track.

7. A method comprising:
receiving, by a first processor, a first sensor signal that is generated by a first sensor in a first vehicle in response to a first operating condition of the first vehicle on a first off-road track;
determining, by the first processor and based on the first operating condition, an attribute of at least one track parameter of the first off-road track, wherein the attribute is a difficulty factor, and wherein the at least one track parameter comprises:
a terrain characteristic parameter;
a terrain elevation variation parameter;
a vehicle pitch variation parameter;
a vehicle roll variation parameter; and
a vehicle yaw variation parameter;
evaluating the difficulty factor of the at least one track parameter to determine a first track score of the first off-road track;
assigning, by the first processor, the first track score to the first off-road track based on evaluating the first sensor signal;
comparing, by the first processor, the first track score assigned to the first off-road track to a second track score assigned to a second off-road track; and
providing, by the first processor, a recommendation for use of the first off-road track or the second off-road track by the first vehicle, based at least in part, on comparing the first track score to the second track score.

8. The method of claim 7, wherein the first operating condition of the first vehicle on the first off-road track comprises an angular orientation of a chassis portion of the first vehicle with respect to a ground surface of the first off-road track, a steering angle of a steering wheel of the first vehicle, a speed of movement of the first vehicle, and/or a braking operation performed upon a brake of the first vehicle.

9. The method of claim 7, further comprising:
receiving, by a second processor, a second sensor signal that is generated by a second sensor in a second vehicle in response to a second operating condition of the second vehicle on the second off-road track; and
assigning, by the second processor, the second track score to the second off-road track based on evaluating the second sensor signal.

10. The method of claim 9, wherein the first processor is included in a first off-road evaluation system provided in the first vehicle and the second processor is included in a second off-road evaluation system provided in the second vehicle.

11. The method of claim 7, further comprising:
determining, by the first processor, a preference for risk by a driver of the first vehicle; and
providing, by the first processor, the recommendation for use of the first off-road track or the second off-road track by the first vehicle, based in further part, on the preference for risk by the driver of the first vehicle.

12. A vehicle comprising:
a sensor system that generates a first sensor signal in response to a first operating condition of the vehicle on a first off-road track; and
an off-road evaluation system comprising:
a memory containing computer-executable instructions; and
a processor configured to access the memory and execute the computer-executable instructions to perform operations comprising:
receiving the first sensor signal from the sensor system;
determining, by the processor and based on the first operating condition, an attribute of at least one track parameter of the first off-road track, wherein the attribute is a difficulty factor, and wherein the at least one track parameter comprises:
a terrain characteristic parameter;
a terrain elevation variation parameter;
a vehicle pitch variation parameter;
a vehicle roll variation parameter; and
a vehicle yaw variation parameter;
evaluating the difficulty factor of the at least one track parameter to determine a first track score of the first off-road track;
assigning the first track score to the first off-road track based on evaluating the first sensor signal;
comparing the first track score assigned to the first off-road track to a second track score assigned to a second off-road track; and
providing a recommendation for use of one of the first off-road track or the second off-road track by the vehicle, based at least in part, on comparing the first track score to the second track score.

13. The vehicle of claim 12, wherein providing the recommendation for use of the first off-road track or the second off-road track by the vehicle comprises displaying the recommendation on a display screen of an infotainment system in the vehicle and/or on a personal communication device of a driver of the vehicle.

14. The vehicle of claim 12, wherein the first operating condition of the vehicle on the first off-road track comprises an angular orientation of a chassis portion of the vehicle with respect to a ground surface of the first off-road track, a steering angle of a steering wheel of the vehicle, a speed of movement of the vehicle, and/or a braking operation performed upon a brake of the vehicle.

15. The vehicle of claim 12, wherein the off-road evaluation system further comprises a first database, and wherein the processor is further configured to access the memory and execute additional computer-executable instructions to perform operations comprising:
storing the first track score in the first database and/or a second database of a server computer.

16. The vehicle of claim 12, wherein the sensor system generates a second sensor signal in response to a second operating condition of the vehicle on the second off-road track, and further wherein the processor is configured to access the memory and execute additional computer-executable instructions to perform operations comprising:
assigning the second track score to the second off-road track based on evaluating the second sensor signal.

17. The vehicle of claim 12, wherein the processor is configured to access the memory and execute additional computer-executable instructions to perform operations comprising:
determining a preference for risk by a driver of the vehicle; and
providing the recommendation for use of one of the first off-road track or the second off-road track by the vehicle, based in further part, on the preference for risk by the driver of the vehicle.

\* \* \* \* \*